United States Patent [19]
Retter et al.

[11] Patent Number: 6,021,421
[45] Date of Patent: Feb. 1, 2000

[54] ENHANCED DSP APPARATUS

[75] Inventors: Rafi Retter; Yonatan Manor, both of Haifa; David Bar, Karmiel; Shlomo Mahlab, Kibbutz Shaar Haamakim; Ronny Aboutboul, Haifa, all of Israel

[73] Assignee: Oren Semiconductor Ltd., Israeli Company, Yogne'Am Illit, Israel

[21] Appl. No.: 08/802,083

[22] Filed: Feb. 19, 1997

[30] Foreign Application Priority Data

Mar. 4, 1996 [IL] Israel .......................................... 117348

[51] Int. Cl.$^7$ ...................................................... G06F 17/15
[52] U.S. Cl. ............................ 708/422; 708/423; 708/424
[58] Field of Search ........................... 364/728.01, 736.01, 364/728.03–728.07; 348/614, 607

[56] References Cited

U.S. PATENT DOCUMENTS

| | | | |
|---|---|---|---|
| 4,644,489 | 2/1987 | Curtin et al. | 364/736 |
| 4,811,267 | 3/1989 | Ando et al. | 364/736 |
| 4,817,014 | 3/1989 | Schneider et al. | 364/728.03 |
| 5,099,328 | 3/1992 | Kobo et al. | 358/167 |
| 5,343,404 | 8/1994 | Girgis | 364/484 |
| 5,386,243 | 1/1995 | Huang et al. | 348/607 |
| 5,600,380 | 2/1997 | Patel et al. | 348/614 |
| 5,623,319 | 4/1997 | Harmon, Jr. et al. | 364/900 |
| 5,656,971 | 8/1997 | Gotoh | 329/308 |
| 5,701,125 | 12/1997 | Berlin | 241/63 |
| 5,724,485 | 3/1998 | Rainton | 395/20 |

Primary Examiner—Ayaz R. Sheikh
Assistant Examiner—Tim Vo
Attorney, Agent, or Firm—Browdy and Neimark

[57] ABSTRACT

An enhanced digital signal processor (EDSP) includes execution section that includes the following constituents: a processor, an arithmetic logic unit (ALU), a memory device for holding set of instructions for execution selected from enhanced set of instructions, a memory device for holding data, another clock generator for generating a plurality of clock signals coupled to above constituents. Internal communication bus coupled to the above constituents for affording controlled communication between them, a correlator, coupled to the bus, for communication with the execution section. The correlator having an input port for receiving external input data and an output port for outputting data. The correlator being controlled by the processor and being responsive to the selected instruction from the enhanced set of instructions, for operating in the following mode: correlator processing mode wherein the correlator receives data from the above constituents and outputs data to the constituents, and wherein the input data received through the input port, is transmitted to the output port in an intact form.

30 Claims, 5 Drawing Sheets

| Correlator processing / filter processing | Block floating disable / enable | Start filter / stop filter | Reset or load coefficients / data | | | | | Structure of filter | | Route output of correlator | | Enable center tap | | Control precision | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

ENHANCED DSP APPARATUS

FIELD OF THE INVENTION

The present invention concerns an improved Digital Signal Processor (DSP).

BACKGROUND OF THE INVENTION

A DSP is the preferable way to increase processor performance for specific applications. DSP applications require a plurality of multiply and multiply-accumulate operations and therefore a Multiplier Accumulator (MAC) unit is added to the traditional micro-processor for enhanced performance.

With the emergence of new applications, like ghost cancellation, wave-form equalization and others, which require various calculations using long filters (referred to also as long filter calculations or operations) system designers started to use conventional DSP's with external memory and known per se external filter devices (referred to occasionally also as "correlators").

The structure and operation of conventional correlator is well known in the literature, see for example *"Theory and Application of Digital Signal Processing"*, Lawrence R. Rabiner- Bernard Gold; Prentice Hill.

The present invention will be described predominantly (but not exclusively) with reference to a ghost cancellation application and accordingly, for a better understanding, there follows a brief explanation of the known per se "ghost" phenomenon in the context of modern television transmissions, as well as conventional techniques for ghost cancellation. In communication applications, the same operation is designated signal equalization, where the received signal is cleaned from channel interferences such as lost of bandwidth and echoes.

Echo signals or ghost signals have been one of the major problems in modern television transmission. When a transmitted signal is received from the air, ghosts can be caused by reflections from mountains, buildings, and the like. In a television signal received through cable, the ghosts can be due to discontinuities of the connectors. Although the ghosts are generated in a radio frequency spectrum, the process in which the ghost is created can be accurately modelled as a linear distortion in a baseband signal. Therefore, cancelling the ghosts can be accomplished by passing the baseband signal through a linear filter which is an inverse of the linear model of the ghosting process.

Typically, ghost cancellation and equalization sequence obey the following algorithmic expression:

$$y(n) = \sum_{i=0}^{I-1} x(n-i) \cdot a(i) + \sum_{j=1}^{J-1} y(n-j) \cdot b(j)$$

Prior efforts in eliminating ghosts used analog technology such as a charge coupled device (CCD) transversal filter which did not produce significant improvement due to inaccuracy of the filter. More recently, a ghost canceler reference (GCR) signal has been proposed for use in the training of filters. Digital filters have become widely accepted as alternative methods to implement the ghost cancelers.

Ghost signals can arrive at a receiver before and after the main signal, resulting in a precursor and postcursor ghost, respectively. A filter suitable for cancelling the precursor ghost is a physically non-realizable infinite impulse response (IIR) filter, which can be approximated by a longer finite impulse response (FIR) filter. The postcursor ghost can be cancelled by an OR filter. Therefore, a typical digital filter for eliminating ghost signals is an FIR feedforward filter for eliminating precursor ghosts followed by an IIR feedback filter, for eliminating postcursor ghosts.

In order to calculate the filter coefficients, a ghost canceler reference (GCR) signal is transmitted from the broadcasting station, typically in one line of the vertical blanking interval (VBI). The coefficient of the filters can be estimated by comparing the received GCR signal with a stored standard GCR signal.

Having described, in general, the ghost phenomenon and a typical sequence of ghost cancellation, the hitherto known application of a DSP for accomplishing ghost cancellation will now be described.

Accordingly by a specific application, both the DSP and the external filter devices coupled thereto execute similar type long filter operations. By this embodiment, the DSP executes long-correlator operations for calculating coefficient which are then loaded to the external filter. Having been loaded with the coefficients, the filter executes long-convolution calculation for filtering the incoming video data thereby accomplishing the desired ghost cancellation.

This approach of a system consisting of a DSP and an external filter meets, thus, the functional requirement of ghost cancellation but at the same time it has some significant shortcomings.

For one, the system is built out of many devices which necessitates a relatively complex interfacing between the various components which renders the structure of the device cumbersome thereby adversely affecting the filter's capability to operate in changing modes of operation that are prescribed by different applications. Moreover, the device of the kind specified is too expensive for low-cost consumer applications, thereby posing undue constraints insofar as many commercial applications are concerned.

SUMMARY OF THE INVENTION

As is well known, the current DSP generation is characterized and differentiated from regular micro-processors by having a Multiplier or Multiplier-accumulator unit. The present invention seeks to take the currently available DSP one step forward by providing an enhanced DSP (EDSP), referred to also as Adaptive Equalizer Digital Signal Processor (AEDSP). Vector operations by the correlator replaces repetitive loops of single Multiply-accumulate as done by DSP.

The EDSP represents a new advanced generation of Digital Signal Processors. The new DSP includes, as one of its major units, one or more correlator units, instead of or in addition to the conventional Multiplier or Multiplier Accumulator. The EDSP is useful for applications, which require long filters for very fast convolution and correlation operations, like ghost cancellation and wave-form equalization. As will be explained in greater detail below, the incorporation of a correlator unit, as an integral sub-module, in the DSP, constitutes an advantage over hitherto known utilization of external filters in conjunction with conventional DSPs, in that it obviates the need for cumbersome interfacing with an external correlator. More specifically, the internal integral correlator of the EDSP is a-priori adapted for communicating with the other components of the DSP in the sense that inter-communication between the components takes place over common and relatively fast bus(es) and in that the EDSP employs a predetermined set of instructions which facilitates efficient exploitation of the correlator separately or in conjunction with other components of the EDSP, such as the Arithmetic Logic Unit (ALU).

The incorporation of the correlator into the DSP gives rise to a device which is normally cheaper and easier to use than the corresponding conventional DSP and external correlator. The incorporation of the correlator(s) into the DSP should preferably be implemented in a specific manner (which is expounded upon below) so as to reduce the space in the die occupied by the EDSP, (referred to also as die space) thereby further reducing the costs thereof.

It is accordingly appreciated that the EDSP exhibits improved performance in terms of speed and flexibility as compared to conventional DSPs which utilize an external correlator and due to the reduced costs of the former it is also more appealing for use in low-cost consumer applications.

According to the invention the correlator is incorporated into the DSP so as to provide a unique architecture that affords the following modes of operations:

1. The loosely coupled mode (referred to also as "filter processing mode"), where the correlator is initiated by the main processor (of the EDSP) and works forever until it is stopped by the main processor. Normally by this mode of operation, the processor of the DSP loads operational parameters into the correlator and triggers its operation. The "load parameter" and "trigger" operations may be realized for example by executing suitable "load" and "start" commands in the processor. After having been triggered, the correlator operates in an essentially similar manner as a conventional correlator until it is stopped by the processor, i.e. it is fed with data which it processes and yields as an output processed data. In the specific example of ghost cancellation the received signal undergoes ghost cancellation in the correlator and the ghost-free signal is output to the TV screen. It should be noted that normally in the filter processing mode of operation, the correlator works in a so called "stand-alone mode"; put differently, it works independently of the other components of the DSP except for being responsive to only limited events initiated by the DSP modules such as "start operation", "stop operation" and "load operational parameters" operations.

2. The closely coupled mode of operation (referred to also as "correlator processing mode"), where the correlator is fed with input data from and outputs data to various modules of the EDSP. Thus, as opposed to the filter processing mode, in the correlator processing mode the correlator inherently communicates with other components of the DSP e.g. one or more of the ALU, memory and processor (execution unit), all depending upon the specific application.

3. The mixed mode operation, where the correlator switches between the above two modes.

There is thus provided in accordance with one aspect of the invention an enhanced digital signal processor (EDSP) comprising, in combination:

execution section that includes the following (i)–(v) constituents:
(i) at least one processor,
(ii) at least one arithmetic logic unit (ALU),
(iii) first memory device for holding set of instructions for execution selected from enhanced set of instructions;
(iv) second memory device for holding data;
(v) clock generator for generating at least one clock signal coupled to at least said (i) and (ii) constituents;

at least one internal communication bus coupled to the constituents of said execution section for affording controlled communication between them;
(vi) at least one correlator, coupled to said at least one bus, for communicating with said execution section; said at least one correlator having at least one input port for receiving external input data and at least one output port for outputting data;

said at least one correlator being controlled by at least one of said processors and being responsive to at least one selected instruction from among said enhanced set of instructions for operating in the following mode:
correlator processing mode wherein said correlator receives data from at least one of said constituents and outputs data to at least one of said constituents, and wherein said input data received through said at least one input port, is transmitted to said output port essentially intact.

If desired said at least one correlator is responsive to at least one selected instruction from among said enhanced set of instructions for operating in the following, mode:
filter processing mode wherein said at least one correlator is active in an essentially stand-alone mode for processing the input data received through said at least one input port and outputting processed data to said at least one output port; said at least one correlator is capable of switching between said correlator processing mode and filter processing mode as many times as required.

By one specific embodiment there is provided an enhanced digital signal processor (EDSP) comprising, in combination:

execution section that includes the following (i)–(v) constituents:
(i) a processor,
(ii) an arithmetic logic unit (ALU),
(iii) first memory device for holding set of instructions for execution selected from enhanced set of instructions;
(iv) second memory device for holding data;
(v) clock generator for generating at least one clock signal coupled to at least said (i) and (ii) constituents;
a communication bus coupled to the constituents of said execution section for affording controlled communication between them;
(vi) a correlator, coupled to said bus, for communicating with said execution section; said correlator having an input port for receiving external input data and an output port for outputting data;

said correlator being controlled by said processor and being responsive to at least one selected instruction from among said enhanced set of instructions for operating in either one of the following modes:
correlator processing mode wherein said correlator receives data from at least one of said constituents and outputs data to at least one of said constituents, and wherein said input data received through said input port, is transmitted to said output port essentially intact.

If desired said correlator is responsive to at least one selected instruction from among said enhanced set of instructions for operating in the following mode:
filter processing mode wherein said correlator is active in an essentially stand-alone mode for processing the input data received through said input port and outputting processed data to said output port; said correlator is capable of switching between said correlator processing mode and filter processing mode as many times as required.

Said first and second memory devices may consist, each, of one or more memory modules, which are optionally extraneous to each other.

As specified in the foregoing, correlators consist as a rule of a plurality of multipliers which occupy relatively large space (in terms of die space) and, therefore the incorporation thereof into the DSP "as is" is undesired inter alia owing to die sizing constraints, i.e it requires large die space.

Accordingly in the above referred to architecture the correlator is coupled to a faster clock as compared to the normal clock of the DSP enabling thus to reduce the number of multipliers that are utilized, during normal operation of the correlator. Assuming, for example, that the correlator's clock is two times faster than that of the conventional DSP which in turn is three times faster than that of the sampling rate of incoming video data, it is readily appreciated that by this configuration the correlator can execute 6 operations (multiplications) for each incoming pixel. This enables to design the correlator with time multiplexing of the same hardware (multipliers) thereby affording the use of a smaller number of multipliers (which obviously results in smaller chip) than the number that would have been required had the correlator been coupled to the data sampling clock (with only one multiplication operation per multiplier for each oncoming pixel).

Accordingly, the utilization of a correlator that is fed with a faster clock (which affords use of a reduced number of multipliers), whilst not degrading the performance of the correlator as compared to conventional correlators, constitutes an advantage in that it occupies smaller die space decreasing thus the overall die space allocated for the EDSP.

Thus, preferably, said clock module is capable of producing at least three synchronized clock rates the first of which determines the input data sampling rate, the second of which being faster than said first clock rate, for determining at least the processor processing rate and the third being faster than said second clock rate for determining the correlator processing rate.

Optionally, and as will be explained in greater detail below, in order to further enhance the EDSP, the number of the multipliers that are utilized in the correlator may be further reduced by employing an improved multiplication algorithm.

In a typical EDSP arrangement, a general purpose correlator unit of the kind specified is integrated into the DSP instead, or in addition to, the conventional Multiplier Accumulator. The latter is typically employed for relatively simple multiplications during normal operation of the DSP. Preferably, the memory module of the DSP is also utilized by the correlator (in the closed coupled mode) thereby obviating the need of associating separate memory to the correlator which eventually results in more efficient operation (by avoiding the need to manage two distinct memories—and further reduction in die size.

The EDSP includes thus a main processor capable of running an extended instruction set which covers the various functions of the correlator units, and allows it to perform various functions in any of the above operating modes.

The EDSP of the invention benefits thus from the flexibility obtained due to the enhanced set of instructions and from the internal fast communication bus which facilitates reliable and effective communication between the various components of the EDSP, all residing on the same die. Moreover, the utilization of the EDSP of the invention is appealing for wide range of low-cost applications due to the provision of the built-in loosely and correlator processing modes of operation and the provision of simple way to switch between them.

If desired, the performance of the EDSP of the invention is further improved by employing time multiplexing of the hardware, i.e. using a faster clock for the data processing, over the data sampling clock (and yet duly synchronized therewith).

Optionally, and as will be explained in greater detail below, the EDSP of the invention can further benefit from the utilization of reduced number of multipliers (as compared to conventional correlators), thereby affording further miniaturization of the EDSP, whilst not degrading its performance. The benefits derived from utilizing a smaller number of multipliers is that it simplifies the pertinent control and it reduces the data volume that has to be transferred to/from the multipliers.

The EDSP of the invention fulfills, thus, a long felt want.

BRIEF DESCRIPTION OF THE DRAWINGS

For a better understanding, the invention will now be described by way of example only with reference to the accompanying drawings, in which.

DESCRIPTION OF SPECIFIC EMBODIMENTS

Figure 1:
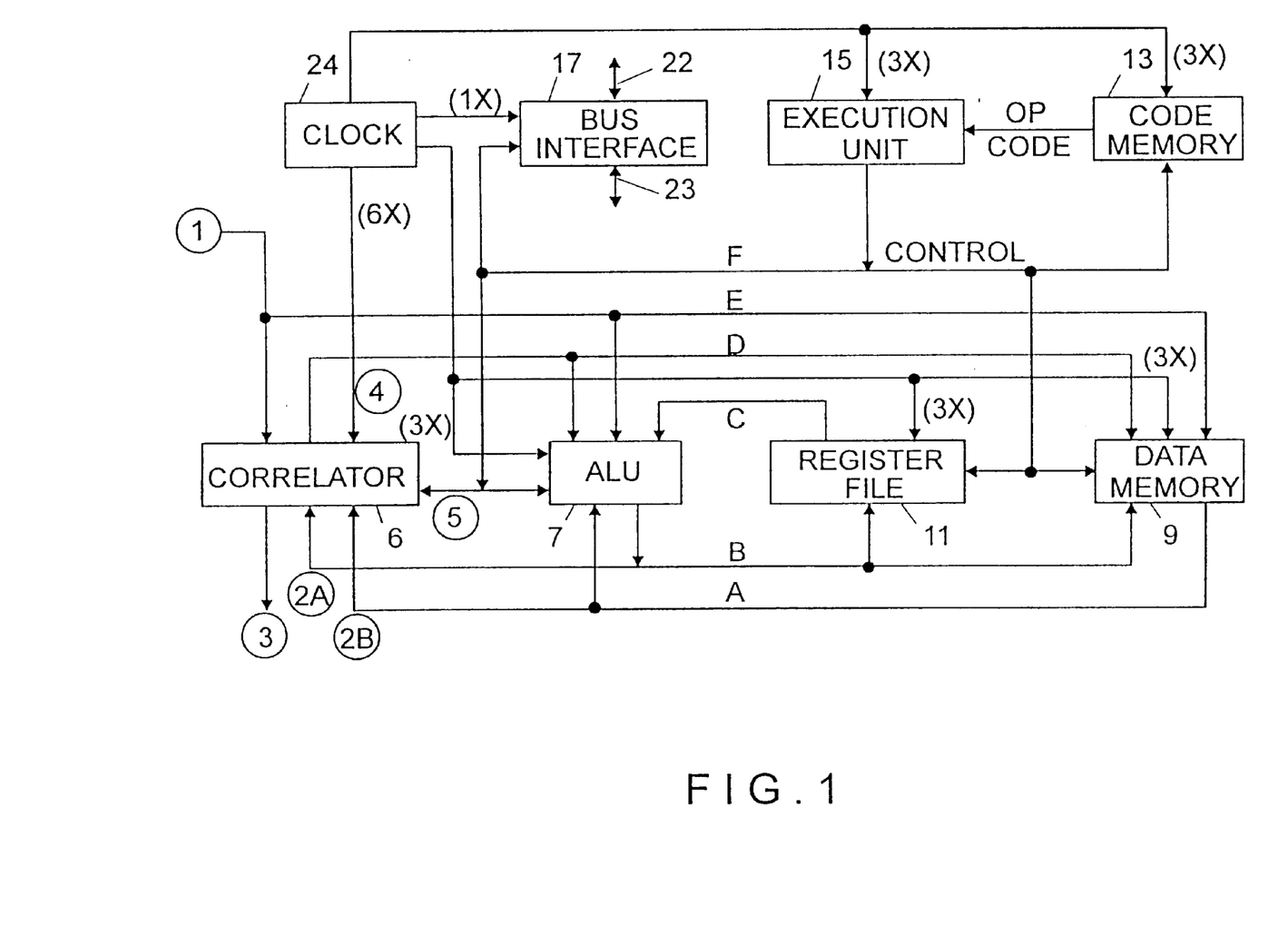
FIG. 1 is a generalized block diagram of an enhanced DSP employing a correlator sub-module, according to one embodiment of the invention.

Shown in FIG. 1 is a typical, yet not exclusive, architecture of an EDSP that includes eight main units and the buses connecting them. Thus, input port 1 is coupled to correlator unit 6, ALU 7 and data memory module 9. Correlator unit 6 outputs data to the ALU 7 via bus D and receives input therefrom via bus 2A. Correlator unit 6 further receives data from data memory module 9, via communication bus A (port 2B), and outputs data (e.g. to TV screen) to port 3 and module 9. As shown, ALU 7 in turn receives data from, and outputs data to Register file module 11 via communication buses "C" and "B" respectively, and also outputs data to data memory module 9 via communication bus B. If desired, the architecture of FIG. 1 may employ at least two correlation units and/or at least two ALUS 7.

As also shown in FIG. 1, register file 11, data memory 9, code memory 13, execution unit 15 (referred to also as main processor), bus interface module 17 as well as correlator 6 and ALU 7 are all interlinked by means of control bus F. It should be noted that code memory module 13 and memory module 19 are not bound to only specific arrangement, e.g. they may be partitioned to two or more sub-modules, all as required and appropriate.

Execution unit 15 runs a program which is normally stored in code memory 13. Bus interface module 17 is coupled to communication lines 22 and 23 which provide interface to the external world. Likewise, the architecture of FIG. 1 may employ a plurality of execution units 15.

As also shown in FIG. 1, clock module 24, which by this particular embodiment and as will be explained in greater detail below, produces three clock rates (basic data clock DCLK rate (X1); processor clock PCLK rate (X3); and correlator clock CCLK rate (X6)), is coupled to the correlator, ALU and Execution unit.

All the components depicted in FIG. 1, except for the correlator, are known per se as they are typically utilized in conventional DSPs and accordingly the hereinbelow description will be confined only to a superficial review of their functionality (for detailed discussion of a DSP structure, see for example user/reference manual of Motorola DSP 560xx family or TI 320xx family.

Thus, Code memory 13 is typically either a Random Access Memory (RAM), loadable through the bus interface unit, or a Read Only Memory (ROM). It holds the program, which is executed by the various EDSP modules (anyone or combination of the Execution unit 15, ALU 7, and correlator 6). During the normal course of operation an instruction is read from the code memory 13 every processor clock pulse (PCLK), except for freeze time.

Execution unit 15 (EU)—decodes the instructions, fetched from the Code memory and executes them using the ALU (7) and the correlator (6). It also controls the instruction flow, the Data memory 9, the register file 11 and the Bus interface unit 17, all as known per se.

Data memory 9—the data memory is a variable width RAM, normally used to store temporary results, filter coefficients and incoming video pixels. It is addressed by the EU 15 using 16 bit special registers which reside in data memory module 9. All accesses are vector accesses and the various parameters (base address, increment/decrement, word/byte, even address/odd address) are controlled by the 16 bit special registers, all as known per se. This type of access, where the full address is not specified in the instruction itself (only the specific special register is specified), is very efficient, since the "opcode" does not use many bits and is perfect for vector operations, executed by this device.

Data can be transferred in to and out of the Data memory module 9 from/to the ALU module 7, the correlator 6 and the external world 3. It is a single port memory, so there is only one access/cycle.

The register file 11 is a regular 16 bit register file with some special registers, located all over the device. Data can be transferred within the register file and between the ALU module 7 and the register file.

The ALU is a single cycle unit, which performs the regular add, subtract, compare, shift and bit test operations. Said ALU may employ one or more multiplier accumulators, and likewise the latter may form distinct modules linked in a known per se manner (not shown) to the EDSP of FIG. 1.

The bus interface unit interfaces between the external world and the device. It is used for conventional $I^2C$ interface, program and data load, general control and transfer of the video data stream.

As shown in FIG. 1, there are several buses, which interlink the various modules. Thus, "A", "B", "C" and "D" are used for data transfer among the various data units as described in the foregoing. The bus "E", transfers incoming pixels fed to port 1 into the correlator 6, the ALU 7 and the Data memory 9, and "F" is the control bus.

It should be appreciated that the specific architecture depicted in FIG. 1 is only one out of many possible variants. Thus by way of a non limiting example the bus configuration of the DSP architecture of FIG. 1 may be altered such that one or more of the buses may be merged together, the DSP may employ more than one correlator, a conventional Multiplier may be incorporated into the EDSP, just to mention a few.

Figure 2:
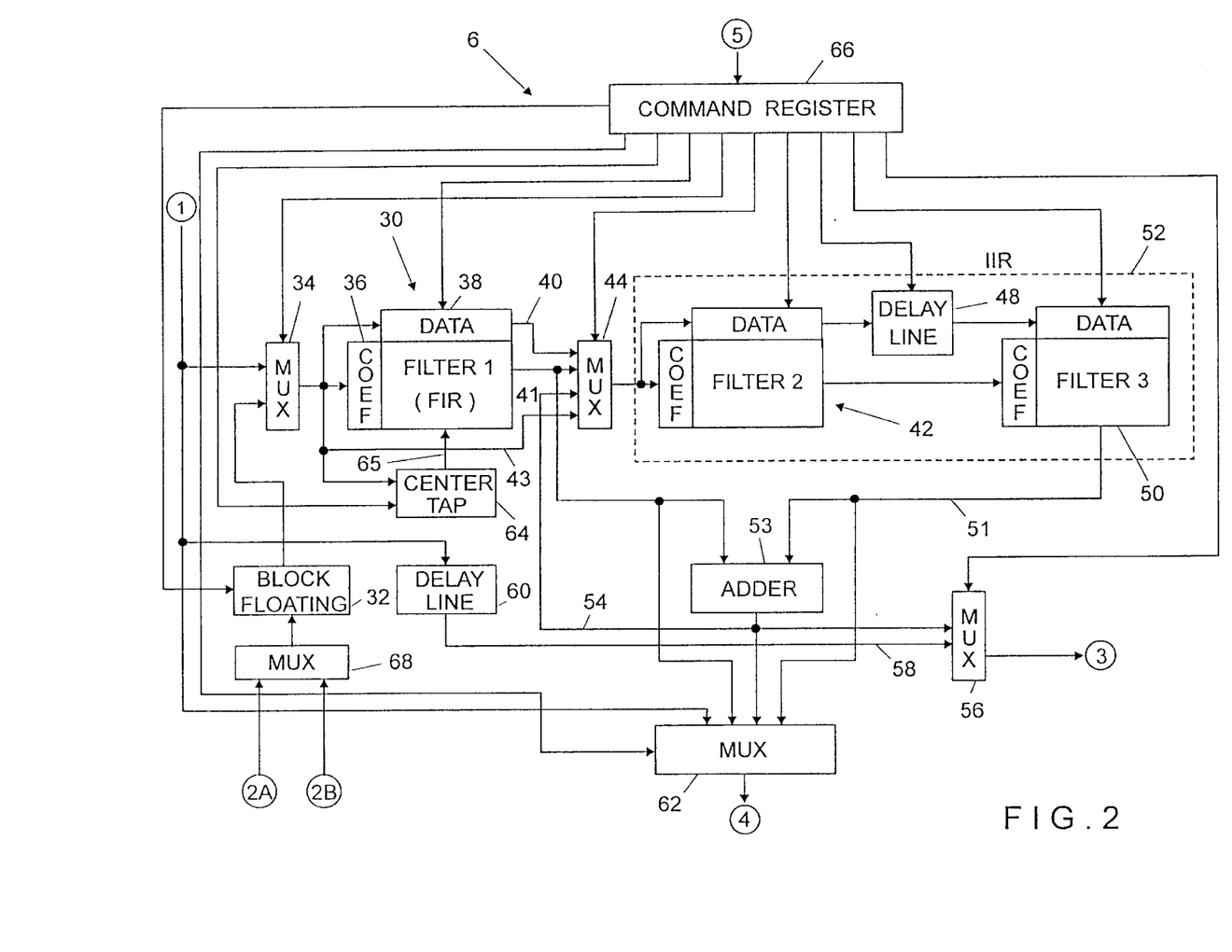
FIG. 2 is a detailed block diagram of a correlator of the kind that is employed by EDSP of FIG. 1, according to one embodiment of the invention.

Having described the structure of the EDSP in general, attention is now directed to FIG. 2 showing a detailed block diagram of a correlator of the kind employed in the EDSP of FIG. 1, according to one specific embodiment of the invention.

The correlator 6 is connected to the input port, the remaining modules of the EDSP and the output port via ports 1, 2A, 2B, 3, 4 and 5 in a manner depicted in FIG. 1. In the specific embodiment of FIG. 2, the correlator includes a Finite Impulse Response (FIR) sub-module 30 coupled to input port 1 and to block floating sub module 32 by the intermediary of multiplexer (in short Mux) 34. The "Coef" and data portions (36 and 38, respectively) of FIR 30 signify the inputs of the FIR which are subject to multiplication. Lines 40 and 41 are coupled to filter 42 by the intermediary of Mux 44 and the data from line 41 is also fed to adder 53. Line 43 bypasses FIR 30 and is coupled directly to Mux 44. Filter 42 having substantially a similar structure to that of FIR 30 constitutes, together with Delay line sub-module 48 and filter 50, an Infinite Impulse Response (IIR) sub-module 52. The output of IIR 52 is fed as a second input 51 to adder 53 and the output 54 of the latter is fed to Klux 44 and to Mux 56. The latter is also coupled to input 58 being the input signal of port 1 after having been subjected to a delay by delay line module 60. As shown, Mux 56 routs either input 54 or 58 to output 3. Also shown in FIG. 2 is Mux 62 which routs any of inputs 1, 41, 54 or 51 to output port 4.

Correlator 6 further includes a so called "center tap" sub-module 64 coupled to Mux 34 for inputting data (65) to FIR 30. As shown, block floating module 32 is coupled to Mux 68 which in turn is coupled to ports 2A and 2B (i.e. with input from the ALU module 7 and the Data memory module 9, respectively).

Finally, command register 66 which communicated through port 5 thereof with the EU 15 and the ALU 7 over the control bus "F", controls the sub modules FIR filter 30, Mux 34, center tap 64, Mux 44, filters 42 and 50 of IIR 52, block floating module 32, Mux 62 and Mux 56, for configuring the correlator to a desired mode and initiating the operation thereof, as will be explained in greater detail below.

As specified in the foregoing the correlator unit is operative predominantly in the following modes:

(i) the filter processing mode, where the correlator processes an external video data stream, based on its configuration. Typically the correlator processes and outputs a new processed data every clock pulse.

(ii) the correlator processing mode, where the data is transferred by the EDSP constituents to the correlator and the processed data is transferred back from the correlator to the EDSP constituents. This can be done either as a single step operation (the execution unit transfers and reads data from the correlator at specific clocks and during the rest of the time the correlator is frozen), or loop operation (the execution unit transfers and reads data from the correlator every clock pulse).

In addition there is a support mode, which is used for configuring the correlator, and loading coefficients or data pixels into the correlator.

Consider for example a ghost cancellation procedure in which an FIR filter is utilized in order to eliminate precursor ghost signals (i.e. ghost signal which arrives typically at 0 to 7.5 $\mu$sec before the main signal) and an IIR filter is utilized in order to eliminate postcursor ghost signals (i.e. ghost signals which arrive typically at 0 to 40 $\mu$sec after the main signal). Module 30 in FIG. 2 represents a 144 tap FIR filter whereas module 52 represents the IIR filter (a 360 tap filter concatenated with a delay line and a 72 tap filter) which in FIG. 2 consists of filter 42 having essentially a similar structure to that of filter 30 and which is operative to eliminate postcursor ghost signals arriving at 0–20 μsec after the main signal. IIR filter further includes filter 50 of similar structure to that of filters 42 and 30, being responsive to delay-line module 48 for eliminating postcursor ghost signals at a window width of 5 μsec ranging over the interval of 20 μsec to 40 μsec after the main signal is received. Put differently, depending upon the configuration of delay line module 48, filter 50 will eliminate postcursor ghost signals at any desired 5 μsec window within the time interval of 20 to 40 μsec after the main signal (e.g., for a given setup, the postcursor ghost signals arriving at 22.5 to 27.5 μsec after the main signal are eliminated). The structure of the FIR and IIR filters as described in the foregoing is generally known per-se and therefore will not be further expounded upon herein.

Also shown in FIG. 2 is a center tap unit 64 for adjusting a main signal reference with respect to which precursor ghost signals and postcursor ghost signals are detected and eliminated.

Typically and as is known per se (see, for example, *"Theory and Application of Digital Signal Processing"*, ibid.) correlators can be configured to operate in large variety of modes such as FIR, IIR, Long FIR, IIR+FIR, Complex Filter, Coefficient load, Data load, External/ Internal data, Block floating, Center tap configuration, Delay lines and clustering, etc As shown in FIG. 2, the input to the IIR unit 52 is a four input multiplexer 44, which defines whether it is configured as an IIR (data comes from the Adder 53), a long FIR (data comes from the FIR data output 40), a second stage FIR (data comes from the FIR output 41) or a parallel FIR (data comes from the input 43). This IIR section can further contain a decision feedback equalizer and a slicer for digital communication operations. The adder 53 adds the two filters outputs. Its output is the correlator unit output (Mux 56) and an optional input to the IIR (Mux 44).

The command register 66, defines the extended instruction set of the device thereby determining, as will be explained in greater detail below the specific configuration of the correlator.

Having described the structure of the main components of the correlator that are depicted in FIG. 2, the operation thereof in the filter processing mode of operation will now be described. In this mode the correlator operates in a stand alone mode much like a conventional correlator, i.e. it processes incoming video data from port 1 and outputs the processed data (Adder output) to bus "3", according to the specific correlator configuration that is dictated by the command register.

Thus, command register 66 configures the correlator to operate in a filter processing mode of operation by commanding Mux 34 and Mux 56 to route the input signal received at port 1 to the FIR 30 and the adder output 54 to port 3. The specific configuration of the correlator in the filter processing mode is also controlled by the command register. Thus, for example, a long FIR initialization requires the provision of a control signal to Mux 44 for routing output 40 of FIR 30 to the IIR input. Command register 66 further determines by means of suitable control lines the window position of filter 50 as well as the desired configuration of center tap module 64. The utilization of a single register for controlling the configuration of the correlator is of course only an example. Thus, by way of non-limiting alternative embodiment, delay line 48 may be controlled by specific instruction (from among the specified enhanced set of instructions—e.g. prescribing window width and location), which are loaded to other register (not shown in FIG. 2) that is, of course, coupled to delay line 48.

Having initialized the correlator to the desired mode of operation in the filter processing mode by simply loading the desired instruction or series of instructions to the command register, the correlator is responsive to a "start" command (which is, of course, not necessarily a separate command, but rather it may be embedded in the "initialize" command) for operating as if it were a conventional external correlator (with no access to other modules of the EDSP) e.g,. by the specific example of ghost cancellation, correlator 6 processes an incoming video data every data clock pulse (DCLK) and furnishes the processed data to port 3 that is normally coupled to a TV screen. A sample command which defines the correlator configuration is given below.

Obviously, the correlator can be stopped or switched to different modes by simply loading a suitable command to the command register.

Those versed in the art will readily understand that any desired configuration of the correlator is simply programmed by utilizing the command register in the manner specified, e.g. responsive to suitable commands, the correlator can be initiated to operate in an IIR mode which involves a provision of a control signal to Mux 44 for duly feeding the output 54 of adder 53 as an input to IIR 52.

For initiating the correlator to operate in the correlator processing mode of operation, a suitable command is loaded to command register 66. In this mode the correlator operates on data coming either from the ALU 7 or the Data memory 9 and the output is transferred to the ALU or to the Data memory, or in other words the correlator is enslaved to the EU 15.

More specifically, EU 15 loads register 66 with command (s) which eventually result in the following actions:

(i) commanding Mux 34 to route the output of block floating module 32 (which, as recalled, is coupled to data memory module 9 or the ALU module 7 by the intermediary of Mux 68) to FIR 30;

(ii) commanding Mux 62 to route one of the inputs 51, 54 and 41 thereof to output port 4 which as recalled serves as an input to both ALU module 7 and data memory module 9;

(iii) commanding Mux 56 to route the output of delay line 60 (which as recalled is coupled to input port 1) to the output 3;

Due to actions (i) and (ii), the correlator is capable of communicating (i.e. receiving and/or transmitting data) with ALU 7 and/or the data memory 9 modules under the control of the EU e.g. for calculating filter coefficients. Command (iii) assures that when the correlator is enslaved to EU, the input data bypasses the correlator and being transmitted (after having been subjected to delay due to delay line module 60) to output 3. Delay line 60 is utilized for synchronization purposes.

As shown, the input data (or selected portion thereof) received at port 1 may also be forwarded to output port 4 of Mux 62 (i.e. for routing one of the inputs 41,51,54 as well as input 1 to output port 4 in a time multiplexed manner). The data is transmitted from output port 4 to data memory 9 or ALU 7, for later processing.

The specific configuration of the correlator may be further determined by the command register in a similar way to that of the filter processing mode of operation.

In the Correlator processing mode, since the execution unit controls the data movements to and from the correlator, it can be done either in a single step mode or in Loop operation. In the single step mode, the execution unit transfers and reads data from the correlator whenever it is required by the program, and during the rest of the time the correlator is idle and in a Freeze mode. In the Loop operation, which will be described later, the execution unit transfers a single data pointer to and from the correlator every DCLK pulse. The Loop itself lasts three instructions (3 PCLK pulses equals 1 DCLK pulse), so the correlator processes data all the time. The timing considerations will be discussed in greater detail below.

Before exemplifying the operation of the correlator in the correlator processing mode with reference to a specific sample program it should be noted that the architecture of the correlator further provides a so called "support mode" which affords the loading of coefficients and data.

There follows a list of a sample program in a correlator processing mode of operation (i.e. the correlator communicates with the ALU 7 and the data memory 9). The program consists of eight instructions of which the first four instructions implement a common loop that sums the output of the correlator 128 times and further finds the maximal value from among said 128 outputs.

|        |                      |     |
|--------|----------------------|-----|
| LOOP   | 3 128 0              |     |
| NOP    | Vsum RG_OUT_B 00     | 100 |
| ADBS1  | Umax 00 Vsum         | 000 |
| CMPBS0 | 00 00 Umax           | 000 |
| MOVD   | 0b0100000001000011   | 000 |
| MOVE   | HW_CNT R1__1N        | 000 |
| BSJMP  | 3 match anl          |     |
| JSR    | Filter_mode          |     |

The first instruction "LOOP 3 128" defines a three instruction loop that is executed 128 times; the second instruction (first instruction in the loop) "NOP Vsum RG_OUT_B 00 1 0 0" loads the correlator output into R0 (being the first input of the ALU) and the variable Vsum (taken from the register file) into R1 (being the second input of the ALU). Vsum which is reset at the onset, will eventually store the result of the summation; Having duly loaded the inputs of the ALU, the third instruction "ADBS1 Umax 00 Vsum 0 0 0" is executed (being the second instruction in the loop) for adding in the ALU R0 and R1 and storing the result in Vsum, and finally the fourth instruction "CMPBS0 00 00 Umax 0 0 0" compares the output of the correlator (fed to R0) with the previous maximum (Umax) and if it is larger stores the new temporary maximum in Umax. Upon completion of the program, Umax, holds the maximum value and Vmax hold the summation.

The MOVD instruction loads command register 66 with a "stop correlator" command, whereas the MOVE., BSJMP, and JSR are general "move" and "jump" instructions based on condition checks which are executed at the EU.

Figure 3:
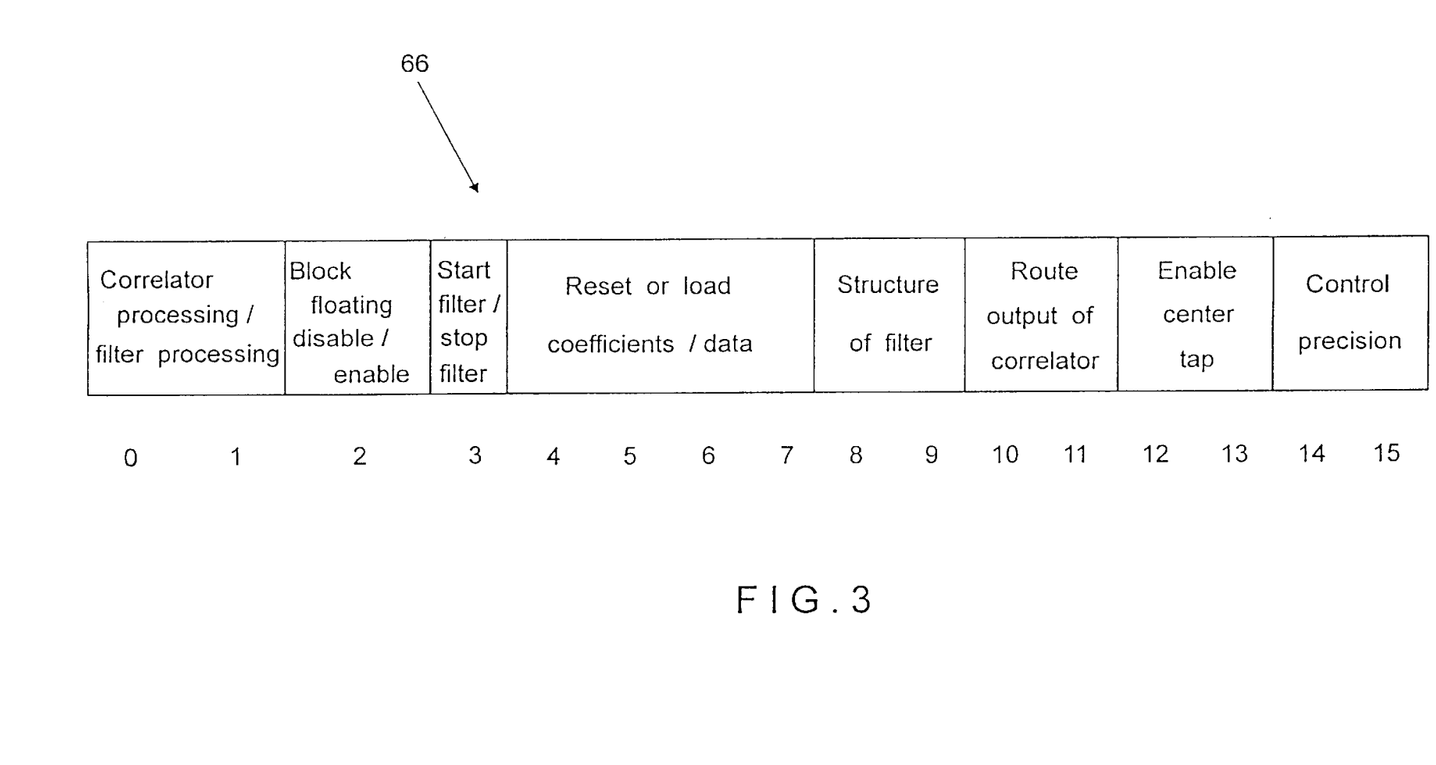
FIG. 3 is a schematic illustration of a structure of a command register, according to one embodiment of the invention.

The MOVD instruction, is a load immediate value to the command register for duly configuring and initiating its operation as discussed in the foregoing. One possible structure of a command register is given in FIG. 3. Thus, Command register 66 consists of 16 bits (bits #0–15) of which the two most significant bits (MSBs) (bits #0,1) define either correlator processing (00) or filter processing (11) modes of operation. The next bit (#2) disables (0) or enables (1) the block floating, operation (for detailed explanation, see below). Bit #3 governs the start filter (1) or stop filter (0) operation. The next four bits (#4–7) are used to reset or load the coefficients or the data of the correlator. The IIR mux (bits #8–9) defines the structure of the filter, e.g. long FIR, FIR+IIR, two stages FIR etc. The output mux bits (#10–11) define which of the outputs of the correlator go back to the ALU (i.e. governing the input/output route of Mux 62). The next two bits (#12 and 13) enable the center tap and the cluster and the last two bits (#14 and 15) serve for controlling the accuracy of the result that is furnished at the output of the correlator by controlling the truncation point.

In the support mode, the execution unit 15 can load either the correlator coefficients or the correlator data when the correlator is idle and does not process data. Both of them are loaded at PCLK rate, (i.e. three times faster than data sampling rate). Data load is used for pre-loading of the correlator to save time. To this end block floating module 32 is utilized. The block floating module is configured to transmit coefficients received through Mux 68 from the ALU or data memory module, according to a predetermined setup. The coefficient are then duly loaded to the various filters for utilization during usage of the correlator in either the filter processing or correlator processing modes of operation.

The latter mode of operation carries a drawback in that it does not duly fit many applications such as ghost cancellation. In the latter, the intensity of the ghost signal varies with time and it is desired to fit the coefficient to the specific ghost signal magnitude, thus, for large intensity ghost signals a low-precision coefficient can be used (e.g. 8-bit-long) whereas for low intensity ghost signals a high-precision coefficient should be used (e.g. 11-bit-long).

Thus, by a specific aspect of the invention the block floating module 32 may be configured to operate in a "variable coefficient size" mode of operation in which the input signal is sampled and analyzed to determine the ghost level and depending upon the ghost level the coefficient size is determined accordingly.

There is thus provided a block floating unit (32) for communicating with a correlator (6), capable of receiving a succession of n-long-bit coefficients (e.g. 11) and deliver to the various components of the correlator (e.g. filters 30 and 52) a corresponding m-long-bit coefficients (e.g. m=8) such that the larger the value of the received n-long-bit input the lower the precision of the delivered m-long-bit coefficient.

Figure 4:
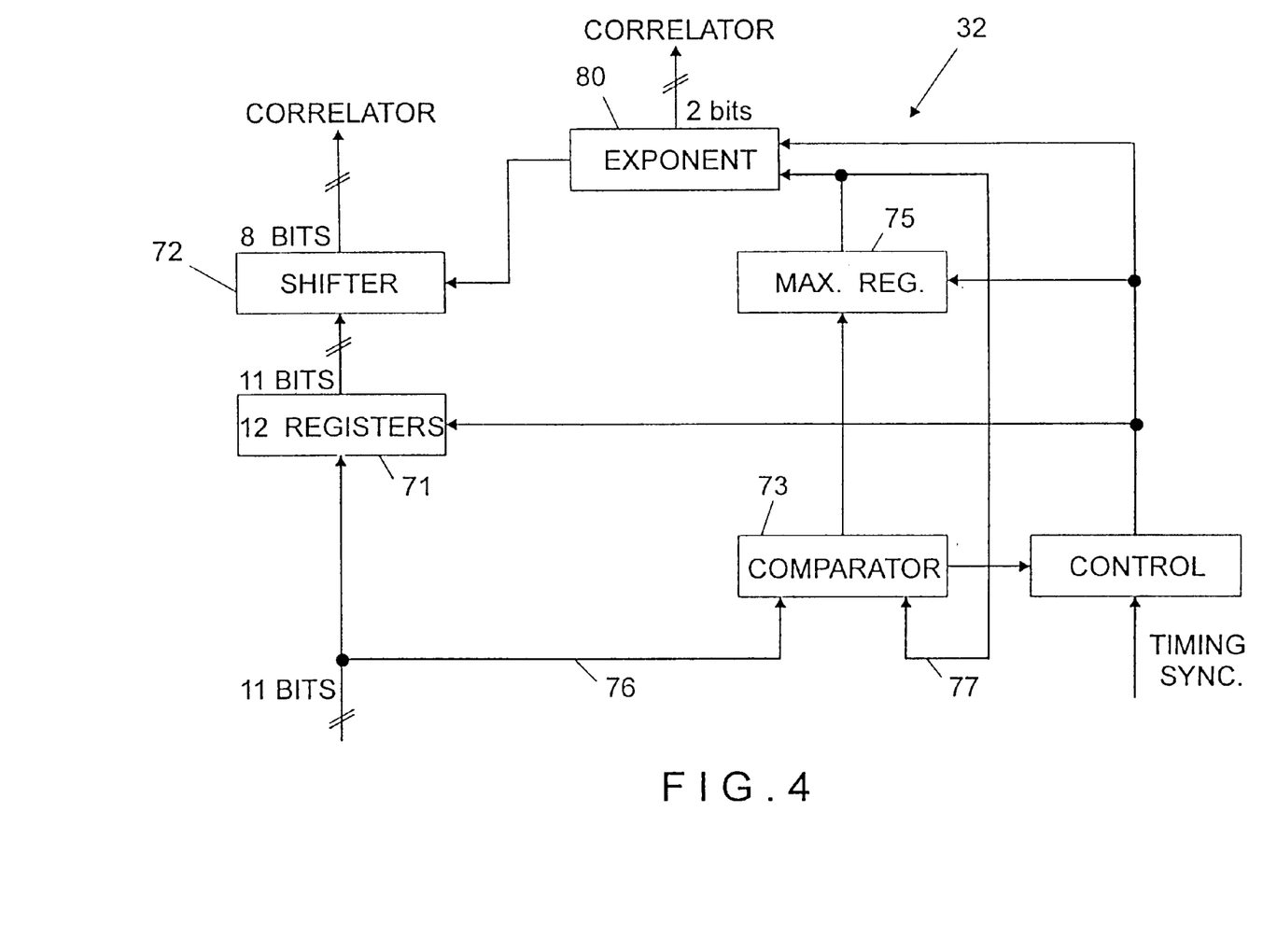
FIG. 4 is a detailed block diagram of a block floating module, of the kind shown in FIG. 1, according to one embodiment of the invention.

More specifically, the block floating module 32 is a serial unit, which operates on the coefficients when they are loaded into the correlator. The input to this block is an 11-bit-long coefficient in this example, and the output is an 8-bit-long coefficient with a 2 bit exponent for every 12 consecutive coefficients. Since most of the coefficients are small and only few are large, this provides higher accuracy for the same dynamic range of the coefficients. For a better understanding, attention is now directed to FIG. 4 showing a detailed block diagram of a block floating module, of the kind shown in FIG. 1, according to one embodiment of the invention.

The block floating, unit 32 has a 12 register delay line 71 and a comparator 73. Each block of 12 successive 11-bit-long coefficients is loaded serially (one every clock pulse) into the delay line 71. During each loading cycle, the comparator 73 compares the currently loaded coefficient (76) with the temporal maximum value, that is stored in the "max reg" register 75, and delivered to the comparator through line 77. In the case that the newly loaded coefficient is larger, register 75 is duly updated.

After the twelfth coefficient is loaded, register 75 holds the maximum coefficient value. During the next 12 clock pulses, while the comparator executes the same function on the next block of 12 coefficients (searching for a maximum and loading the delay line) the previous 12 coefficients are loaded serially into the correlator, however not as 11-bit-long coefficient but rather as 8-bit-long coefficients based on the maximum coefficient value (and the required precision). Thus, if the maximum value occupies all the eleven bits (i.e. high intensity ghost) the 3 LSBs (i.e. bits #0–2) are rounded and truncated and thereafter the remaining 8 MSBs (i.e. bits #3–11) are loaded. If the maximum value occupies only the 10 bits (i.e. the MSB #10 is reset), the redundant MSB is disregarded, the two LSBs (bits #0,1) are rounded and truncated (at the shifter 72) and the remaining 8 bits (bits #2–9) are loaded. If the maximum value occupies 9 bits the redundant 2 MSBs are disregarded (bits #10,11) and the LSB (bit #0) is rounded and truncated and bits #1–9 are loaded. Finally, if the maximum value occupies 8 bits (signifying low intensity ghost) the 3 redundant MSBs (bit #9–11) are disregarded and bits #0–7 are loaded.

Together with these twelve 8-bit-long coefficients the block floating unit also sends a 2 bit exponent (block 80) to the correlator in accordance with the specified maximum value, i.e. '00' (0 in decimal) value for 8-bit maximum, which as recalled necessitated no truncation, to '11' (3 in decimal) for 11-bit maximum which as recalled necessitated truncation of the three LSBs. The correlator executes multiples of twelve 8×8 multiplications and shifts left each result based on the 2 bit value which is attached to every 12 coefficients. Put differently, for 8-bit maximum, since no truncation had occurred, no compensation is required whereas for 11-bit maximum three LSB had been truncated which results in 3 shifts right of each result. All the twelve intermediate results are summed together for the final correlator result.

The block floating operation increases the effective dynamic range from 8 bits to around 10.7 bits at the average.

If desired, the block floating module can be configured by utilizing command register 66, to operate in other modes e.g. a suppressed mode wherein the input coefficients are transparently transmitted from Mux 68 to the filter.

The EDSP of the invention employs unique timing considerations as follows:

There are three clocks synchronized to each other, which control the device timing:

1. The data clock (DCLK—clock frequency), which defines the data sampling rate from the external world (i.e. the data sampling rate of data received at input port 1).
2. The processor clock (PCLK—n times the DCLK rate clock frequency), which controls all units except for the correlator unit. In the current design n=3.
3. The correlator clock (CCLK—mn times the DCLK rate clock frequency), which controls the correlator unit. In the current design m=2, so mn=6.

Since the incoming pixel rate is ⅓ of the processor rate, three instructions can be executed per each received pixel. This, preferably defines the basic loop, which is used when the execution unit is using the correlator block as one of its resources. In addition the loop instruction itself is synchronized to the data clock, so that all data transfers in the device are synchronized to each other.

The number of sampling clocks, their rates, and other parameters pertaining to the clock may be modified, as required and appropriate. Yet, regardless of which modified embodiment is concerned, the execution rate of the correlator should be faster than that of the input sampling rate.

By a preferred embodiment of the invention a unique structure of the miniaturized filter (e.g. at least one of the filters 30, 42 and 50) is utilized which affords a compact structure that is reflected in a relatively small die size, whilst not affecting the performance of the filter. A typical yet not exclusive example of a filter of this kind is the ZR 36020 Model, commercially available from Zoran Corp. Israel, which realizes the known Booth algorithm. In this model, N multiplications are performed in parallel, without generating each multiplication separately, i.e. all intermediate results are basically meaningless and only the final result provides the required result. This procedure eliminates all carry chains logic except for the last stage, enabling a design of small and fast circuits. This basic block is the foundation of the miniaturized filter, and with its small size and excellent performance it enables integration of the correlator for minimal cost, providing superior performance with lower cost over external correlator.

Those versed in the art will readily understand that the specific architecture described in the foregoing with reference to FIGS. 2 and 4, is only one out of many possible variants. Thus, by way of a non limiting example, the IIR filter section 52 can be divided even further with two or more delay lines (48) between them. This structure is preferably used for clustering operations. It should be noted that the present invention encompasses any desired combination of transversal filters, delay lines, multiplexers and adders, all as required and appropriate.

The invention thus provides for an EDSP adapted to operate in a correlator processing mode of operation in which the correlator is inherently operative to cooperate with other components of the DSP. There is further provided an inherent mechanism for smooth switching to a filter processing mode in which the correlator operates in an essentially stand alone mode of operation.

The various modes of operations of the correlator, as an integral constituent of the EDSP, are governed by a unique set of instructions which together with the traditional set of instructions of the DSP constitute an enhanced set of instructions.

Typical yet not exclusive examples of extended instructions are:

A synchronized loop instruction to facilitate the timing interface between the execution unit and the correlator.

A parallel Data memory fetch/write with a register file transfer, an ALU operation and a correlator operation.

A command register for defining the correlator mode of operation (FIR, IIR, Long FIR, IIR+FIR, Complex Filter, Coefficient load, Data load, External/Internal data, Block floating, Center tap configuration, Delay lines and clustering, etc.).

Other instructions may be used in lieu or in addition to those specified in the foregoing, all as required and appropriate.

The flexibility of the EDSP of the invention affords the use thereof not only in applications of the kind specified but also in many others. Thus, by way of non-limiting example, the EDSP of the invention may be utilized in an application described in U.S. Pat. No. 5,386,243, which deals with stealing video lines during the Vertical Blanking Interval (VBI).

By this particular application, the correlator is used most of the time to process external data in filter processing mode and at specific times the correlator is "stolen" by the main processor (i.e. switched to a correlator processing mode) so as to process internal data.

This method of operation is relevant of course to many other applications like VSB, QAM and others, which require filter type operations and time sharing.

Figure 5:
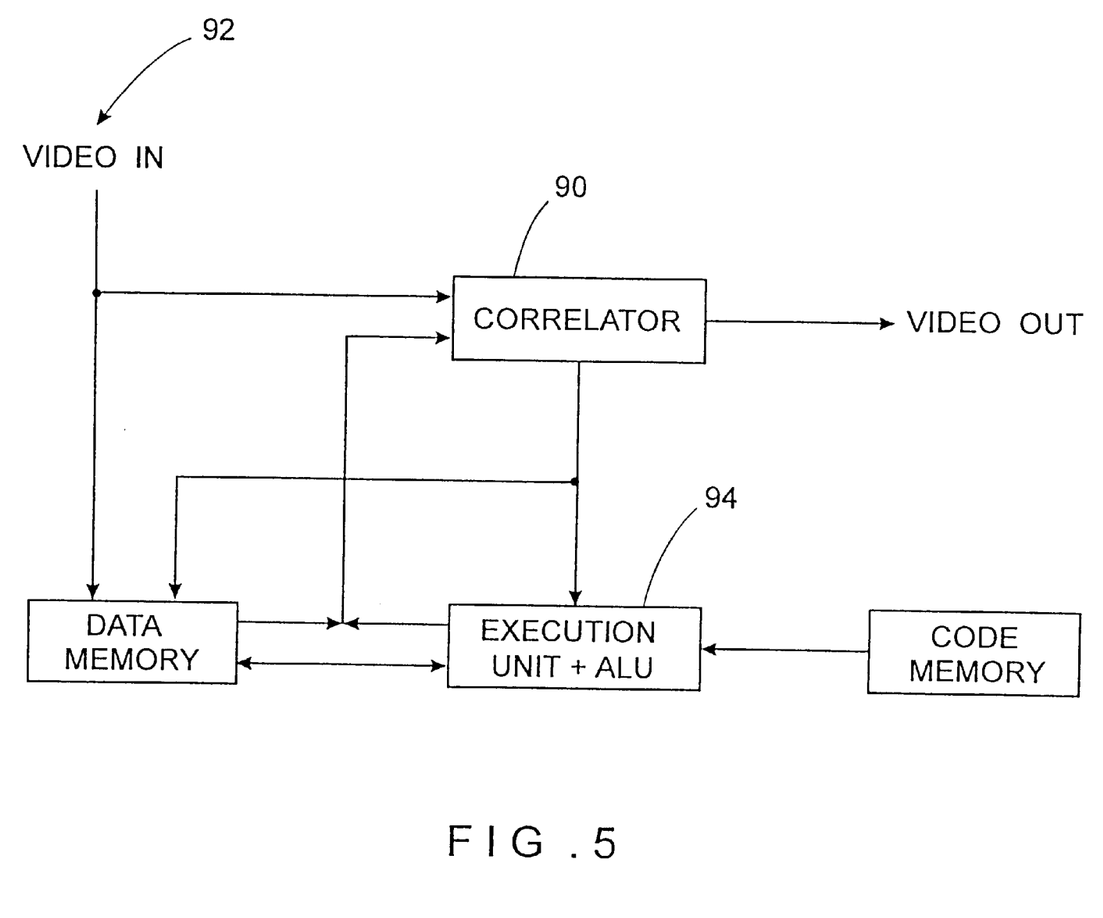
FIG. 5 is a simplified block diagram of use of a correlation of the invention in ghost cancellation application and in stealing video lines during a vertical blanking interval application.

Attention is now directed to FIG. 5 showing simplified block diagram of use of a correlation of the invention in ghost cancellation application and in stealing video lines during a vertical blanking interval application.

In FIG. A, the correlation 90 is coupled both to the video in input 92 and to execution unit+ALU unit 94 thereby realizing, as is well known to those versed in the art, the specified applications.

The present invention has been described with a certain degree of particularity but it should be understood that various modifications and alteration may be made without departing from the scope or spirit of the invention as defined by the following claims:

We claim:

1. In a digital signal processing device of the type including an execution section having components including
   (i) at least one processor,
   (ii) at least one arithmetic logic unit,
   (iii) a first memory for holding an enhanced set of execution instructions,
   (iv) a second memory for holding data,
   (v) a clock generator outputting clock signals to the processor and the arithmetic logic unit, and
   (vi) at least one computational unit, being controllable by the instructions from the processor, having a computational unit input port for receiving data and a computational unit output port for outputting data;

the improvement comprising enhanced digital signal (EDSP) processing comprising:
   (a) all of the components of the execution section are included in a single-die integrated circuit;
   (b) the single-die integrated circuit includes at least one internal communication bus interconnecting the components of the execution section for exchange of data or instructions therebetween;
   (c) the computational unit comprises hardware elements including at least one multiplexer, at least one IIR filter, and at least one FIR filter, and interconnections among the hardware elements, whereby the computational unit is configurable into various specific configurations of the computational unit hardware elements, the computational unit being configurable via instructions from the processor;
   (d) the first memory includes at least one first execution instruction causing the processor to run the execution section in a correlator processing mode wherein
   the computational unit accepts data from at least one of the components of the execution section, correlates the data, and sends the data to at least one of the components of the execution section via the internal communication bus;
   (e) the first memory includes at least one second execution instruction causing the processor to run the execution section in a filter processing mode wherein
   the computational unit acts as a stand-alone filter processing input data received from the input port and outputting processed data from the output port;
   (f) whereby the computational unit is switchable between the correlator processing mode and the filter processing mode according to the instructions from the processor.

2. The EDSP of claim 1, wherein said first and second memory devices consist each of first and second groups of memory modules, respectively, and wherein said first group of memory modules is extraneous to said second group of memory modules.

3. The EDSP according to claim 1, further comprising at least one Multiplier accumulator coupled to the at least one of said buses.

4. The EDSP according to claim 1, wherein said filter processing mode comprising a repertoire of sub-modes defined each by one or more instructions from among said selected instructions.

5. The EDSP according to claim 1, wherein said correlator processing mode comprising a repertoire of sub-modes defined each by one or more instruction from among said selected instructions.

6. The EDSP according to claim 1, wherein said clock module is capable of producing at least three synchronized clock rates the first of which determines the input data sampling rate, the second of which being faster than said first clock rate, for determining at least the processor processing rate and the third being faster than said second clock rate for determining the computational unit processing rate.

7. The EDSP according to claim 1, wherein in said computational unit processing mode, said computational unit is responsive to one or more instructions from among said selected instructions, for transmitting selected portion of said input data to said second memory device for later processing.

8. The EDSP according to claim 1, wherein said computational unit further including a block floating module, capable of receiving a succession of n-long-bit coefficients and deliver to the various components of the correlator a corresponding m-long-bit coefficients (m$\leq$n) such that the larger the value of the received n-long-bit input the lower the precision of the delivered m-long-bit coefficient.

9. The EDSP according to claim 1, wherein said computational unit employs a multiplication algorithm by Booth.

10. The EDSP according to claim 1, wherein said computational unit includes, or is coupled to a 16 bit command register (bits #0–15) having the following configuration:
    bits #0,1 define either correlator processing (00) or filter processing (11) modes of operation; bit (#2) disables (0) or enables (1) the block floating operation; bit #3 governs the start filter (1) or stop filter (0) operation; bits (#4–7) are used to reset or load the coefficients or the data of the computational unit; the IIR mux (bits #8–9) define the structure of the filter; the output mux bits (#10–11) define which of the outputs of the computational unit go back to the ALU; bits #12 and 13 enable the center tap and the cluster, and bits #14 and 15 serve for controlling the precision of the result that is furnished at the output of the computational unit by controlling the truncation point.

11. The EDSP according to claim 1, wherein said enhanced instructions, include:
    a synchronized loop instruction to facilitate the timing interface between the execution unit and the computational unit
    a parallel Data memory fetch/write with a register file transfer, an ALU operation and a computational unit operation
    a command register instruction for defining the correlator mode of operation FIR, IIR, Long FIR, IIR+FIR, Complex Filter, Coefficient load, Data load, External/Internal data, Block floating, Center tap configuration, Delay lines and clustering.

12. The EDSP according to claim 1, for use in ghost cancellation application.

13. The EDSP according to claim 1, for use in ghost cancellation application.

14. The EDSP according to claim 1, for use in stealing video lines during a Vertical Blanking Interval, application.

15. The EDSP according to claim 1, for use in stealing video lines during a Vertical Blanking Interval, application.

16. The enhanced digital signal processing device according to claim 1, wherein the computational unit comprises an FIR filter mode, and IIR filter mode, and a convolution mode.

17. The enhanced digital signal processing device according to claim 1, wherein the FIR filter and the IIR filter are in series, whereby the IIR filter accepts signals from the FIR filter.

18. The enhanced digital signal processing device according to claim 1, wherein the IIR filter comprises a center tap.

19. The enhanced digital signal processing device according to claim 1, wherein the multiplexer comprises a first multiplexer feeding the FIR filter and a second multiplexer feeding the IIR filter.

20. The enhanced digital signal processing device according to claim 1, wherein the first multiplexer selectively routes data from the second memory and the arithmetic logic unit to the FIR filter.

21. The enhanced digital signal processing device according to claim 1, wherein the second multiplexer selectively routes data from the arithmetic logic unit and an adder to the IIR filter.

22. The EDSP according to claim 4, wherein said repertoire of sub-modes include:
one of the following flexible modes:
long Finite Impulse Response (FIR);
Infinite Impulse Response (IIR);
a second stage FIR;
a parallel FIR; and
determination of a window position in filter IIR, as well as the desired configuration of a center tap module.

23. The EDSP according to claim 5, wherein said repertoire of sub-modes include:
receiving data from either or both of the at least one ALU and said second memory device, and transmitting data to either or both of said ALU and said second memory device.

24. The EDSP according to claim 5, wherein said repertoire of sub-modes further include:
one of the following flexible modes:
long Finite Impulse Response (FIR);
Infinite Impulse Response (IIR);
a second stage FIR;
a parallel FIR; and
determination of a window position in filter IIR, as well as the desired configuration of a center tap module.

25. The EDSP according to claim 6 wherein said second clock rate is three times faster than said first clock rate and said third clock rate is twice faster than said second clock rate.

26. The EDSP according to claim 8, wherein said n=11 and m=8.

27. The EDSP according to claim 8, wherein the precision of the m-long-bit coefficient is determined on the basis of the largest coefficient for each received i coefficients.

28. The EDSP according to claim 8, wherein the highest precision m-long-bit coefficient is determined by taking the m least significant bits from each received n-long bit coefficient, and wherein said highest precision m-long-bit coefficient is determined by taking the m most significant bits from each received n-long bit coefficient.

29. The enhanced digital signal processing device according to claim 17, wherein the IIR filter comprises two FIR filters in series.

30. The EDSP according to claim 27, wherein said i=12.

* * * * *